United States Patent
Puranen et al.

(10) Patent No.: US 10,535,883 B2
(45) Date of Patent: Jan. 14, 2020

(54) PROTECTION ARRANGEMENT AND METHOD OF SOLID OXIDE CELLS

(71) Applicant: Elcogen Oy, Vantaa (FI)

(72) Inventors: Jouni Puranen, Tampere (FI); Matti Noponen, Espoo (FI)

(73) Assignee: ELCOGEN OY, Vantaa (FI)

( * ) Notice: Subject to any disclaimer, the term of this patent is extended or adjusted under 35 U.S.C. 154(b) by 0 days.

(21) Appl. No.: 15/921,159

(22) Filed: Mar. 14, 2018

(65) Prior Publication Data

US 2018/0205094 A1 Jul. 19, 2018

Related U.S. Application Data

(63) Continuation of application No. PCT/FI2015/050608, filed on Sep. 14, 2015.

(51) Int. Cl.
*H01M 8/0228* (2016.01)
*C23C 4/129* (2016.01)
(Continued)

(52) U.S. Cl.
CPC ............ *H01M 8/0228* (2013.01); *C23C 4/10* (2013.01); *C23C 4/129* (2016.01); *C23C 4/134* (2016.01);
(Continued)

(58) Field of Classification Search
CPC ..... H01M 8/0228; H01M 8/1246; C23C 4/10; C23C 4/129; C23C 4/134; C23C 429/52; C23C 429/522
(Continued)

(56) References Cited

U.S. PATENT DOCUMENTS

| 5,942,349 A | 8/1999 | Badwal et al. |
| 2004/0018409 A1 * | 1/2004 | Hui ................ H01M 4/8621 429/489 |

(Continued)

FOREIGN PATENT DOCUMENTS

| DE | 19627504 C1 * | 10/1997 | ............ C23C 4/02 |
| JP | 2010003529 A | 1/2010 | |

(Continued)

OTHER PUBLICATIONS

Brueckner Belinda, Machine Translation of DE-19627504-C1, Oct. 1997 (Year: 1997).*
(Continued)

*Primary Examiner* — Sean P Cullen
(74) *Attorney, Agent, or Firm* — Buchanan Ingersoll & Rooney PC

(57) ABSTRACT

A protection arrangement including the first coating and another coating on metal structure of solid oxide cells, each solid oxide cell having at least two fuel cell structure plates made of metal to arrange gas flows in the cell, and an active electrode structure, which includes an anode side, a cathode side, and an electrolyte element between the anode side and the cathode side. The protection arrangement can include: a first metal oxide coating on a metallic structure in a first thermal spraying coating process of a liquid precursor being from at least one of nitrates and acetates based substances fed into thermal flame; and at least one other metal oxide coating formed at least partly simultaneously with the first coating process on the previously deposited metal oxide coating from a liquid precursor.

8 Claims, 6 Drawing Sheets

(51) Int. Cl.
*C23C 4/134* (2016.01)
*C23C 4/10* (2016.01)
*H01M 8/1246* (2016.01)
*H01M 8/124* (2016.01)

(52) U.S. Cl.
CPC .. *H01M 8/1246* (2013.01); *H01M 2008/1293* (2013.01)

(58) Field of Classification Search
USPC .......................................... 429/520, 522, 535
See application file for complete search history.

(56) References Cited

U.S. PATENT DOCUMENTS

| | | | |
|---|---|---|---|
| 2007/0178004 A1 | 8/2007 | Laatsch et al. | |
| 2007/0259126 A1* | 11/2007 | Vassen ................... | C04B 41/52 427/446 |
| 2009/0042084 A1* | 2/2009 | Kobayashi .............. | C23C 18/42 429/484 |
| 2013/0209917 A1* | 8/2013 | Himeno .............. | H01M 8/0206 429/509 |
| 2013/0230792 A1* | 9/2013 | Wilson ................ | H01M 8/0208 429/509 |
| 2014/0030632 A1 | 1/2014 | Larsen et al. | |
| 2015/0194682 A1* | 7/2015 | Ashary ............... | H01M 8/0228 429/468 |
| 2018/0166678 A1* | 6/2018 | Puranen .................. | H01M 8/12 |

FOREIGN PATENT DOCUMENTS

| | | |
|---|---|---|
| WO | WO 96/28855 A1 | 9/1996 |
| WO | WO 2005/091408 A1 | 9/2005 |
| WO | WO 2012/143118 A1 | 10/2012 |

OTHER PUBLICATIONS

Fauchais et al., "Key Challenges and Opportunities in Suspension and Solution Plasma Spraying", Plasma Chemistry and Plasma Processing, Nov. 2014, pp. 511-525, vol. 35, No. 3.

International Search Report (PCT/ISA/210) dated Dec. 3, 2015, by the European Patent Office as the International Searching Authority for International Application No. PCT/FI2015/050608.

Written Opinion (PCT/ISA/237) dated Dec. 3, 2015, by the European Patent Office as the International Searching Authority for International Application No. PCT/FI2015/050608.

International Preliminary Report on Patentability (PCT/IPEA/409) dated Jan. 4, 2018, by the European Patent Office as the International Preliminary Examining Authority for International Application No. PCT/FI2015/050608.

Office Action (Notice of Grounds for Rejection) dated Sep. 11, 2018, by the Korean Patent Office in corresponding Korean Patent Application No. 10-2018-7010608, and an English Translation of the Office Action. (12 pages).

* cited by examiner

| Process description | Conventional thermal spraying (dry powder) | | Suspension thermal spraying (solvent and solid particles) | | Solution precursor thermal spraying (solution containing metallic salts) |
|---|---|---|---|---|---|
| | Solid state synthesis | Liquid state synthesis | Solid state synthesis | Liquid state synthesis | Liquid state synthesis |
| Mixing or diluting precursors | X | X | X | X | X |
| Calcination |  | X |  | X |  |
| Milling* | X | X | X | X |  |
| Sintering* (material synthesis) | X | X | X | X |  |
| Milling | X | X | X | X |  |
| Sifting | X | X |  |  |  |
| Spray drying (particle formation) | X | X |  |  |  |
| Sintering | X | X |  |  |  |
| Thermal spraying (melting) | X | X | X | X | X** |

\* Process steps are repeated until homogeneous powder composition is achieved

\*\* Droplet formation, materials synthesis and melting

Fig. 6

PROTECTION ARRANGEMENT AND METHOD OF SOLID OXIDE CELLS

RELATED APPLICATION

This application claims priority as a continuation application under 35 U.S.C. § 120 to PCT/FI2015/050608 filed as an International Application on Sep. 14, 2015 designating the U.S., the entire content of which is hereby incorporated by reference in its entirety.

FIELD

Most of the energy of the world is produced by oil, coal, natural gas or nuclear power. All these production methods have their specific issues as far as, for example, availability and friendliness to environment are concerned. As far as the environment is concerned, especially oil and coal cause pollution when they are combusted. An issue with nuclear power is, at least, storage of used fuel.

Especially because of the environmental problems, new energy sources, more environmentally friendly and, for example, having a better efficiency than the above-mentioned energy sources, have been developed. Fuel cells, by which energy of fuel, for example biogas, is directly converted to electricity via a chemical reaction in an environmentally friendly process and electrolysers, in which electricity is converted to a fuel, are promising future energy conversion devices.

Renewable energy production methods such as photovoltaic and wind power faces issues in seasonal production variations as their electricity production is limited by environmental effects. In the case of over production, hydrogen production through water electrolysis is suggested to be one of the future energy storing options. Furthermore, an electrolysis cell can also be utilized to produce high quality methane gas from renewably biogas stores.

BACKGROUND INFORMATION

A fuel cell, as presented in FIG. 1, includes an anode side 100 and a cathode side 102 and an electrolyte material 104 between them. In solid oxide fuel cells (SOFCs) oxygen 106 is fed to the cathode side 102 and it is reduced to negative oxygen ion. The negative oxygen ion goes through the electrolyte material 104 to the anode side 100 where it reacts with fuel 108 producing electrons, water and also, for example, carbon dioxide (CO2). Anode 100 and cathode 102 are connected through an external electric circuit 111 having a load 110 for the fuel cell withdrawing electrical energy alongside heat out of the system. The fuel cell reactions in the case of methane, carbon monoxide and hydrogen fuel are shown below:

Anode: $CH_4 + H_2O = CO + 3H_2$ $CO + H_2O = CO_2 + H_2$ $H_2 + O^{2-} = H_2O + 2e^-$ Cathode: $O_2 + 4e^- = 2O^{2-}$ Net reactions: $CH_4 + 2O_2 = CO_2 + 2H_2O$ $CO + \tfrac{1}{2}O_2 = CO_2$ $H_2 + \tfrac{1}{2}O_2 = H_2O$ In electrolysis operating mode (solid oxide electrolyzer cells (SOEC)) the reaction is reversed, i.e. heat, as well as electrical energy from a source 110, are supplied to the cell where water and often also carbon dioxide are reduced in the cathode side forming oxygen ions, which move through the electrolyte material to the anode side where oxygen oxidation reaction takes place. It is possible to use the same solid electrolyte cell in both SOFC and SOEC modes.

Solid oxide electrolyser cells operate at temperatures which allow high temperature electrolysis reaction to take place, the temperatures being for example, between 500-1000° C., but even over 1000° C. temperatures may be useful. These operating temperatures are similar to those conditions of the SOFCs. The net cell reaction produces hydrogen and oxygen gases. The reactions for one mole of water are shown below:

Cathode: $H_2O + 2e^- \rightarrow 2H_2 + O^{2-}$

Anode: $O^{2-} \rightarrow \tfrac{1}{2}O_2 + 2e^-$

Net Reaction: $H_2O \rightarrow H_2 + \tfrac{1}{2}O_2$

In Solid Oxide Fuel Cell (SOFC) and Solid Oxide Electrolyzer (SOE) stacks the flow direction of the cathode gas relative to the anode gas internally in each cell as well as the flow directions of the gases between adjacent cells, are combined through different cell layers of the stack. Further, the cathode gas or the anode gas or both can pass through more than one cell before it is exhausted and a plurality of gas streams can be split or merged after passing a primary cell and before passing a secondary cell. These combinations serve to increase the current density and minimize the thermal gradients across the cells and the whole stack.

SOFC and SOEC stacks include stacked cell elements and separators in a sandwiched manner wherein each cell element is constituted by sandwiching an electrolyte, the anode side and the cathode side. The reactants are guided by flow field plates to the porous electrodes.

A SOFC delivers in normal operation a voltage of approximately 0.8V. To increase the total voltage output, the fuel cells can be assembled in stacks in which the fuel cells are electrically connected via flow field plates (also: separator plates, interconnect plates, interconnector plates, bipolar plates, current collector plates). The desired level of voltage determines the number of cells needed.

Bipolar plates separate the anode and cathode sides of adjacent cell units and at the same time enable electron conduction between anode and cathode. Interconnects, or bipolar plates are normally provided with a plurality of channels for the passage of fuel gas on one side of an interconnect plate and oxidant gas on the other side. The flow direction of the fuel gas is defined as the substantial direction from the fuel inlet portion to the fuel outlet portion of a cell unit. Likewise, the flow direction of the oxidant gas, the cathode gas, is defined as the substantial direction from the cathode inlet portion to the cathode outlet portion of a cell unit.

Known cells are stacked one on top of each other with a complete overlap resulting in a stack with for instance co-flow having all fuel and oxidant inlets on one side of the stack and all fuel and oxidant outlets on the opposite side. One feature affecting the temperatures of the structure in operation is steam reformation of the fuel that is fed into the cell. Steam reformation is endothermic reaction and cools the fuel inlet edge of the cell. Due to the exothermicity of the electrochemical process, the outlet gases leave at higher temperature than the inlet temperature. When endothermic and exothermic reactions are combined in an SOFC stack a significant temperature gradient across the stack is generated. Large thermal gradients induce thermal stresses in the stack which are highly undesirable and they entail differences in current density and electrical resistance. Therefore the issue of thermal management of an SOFC stack exists: to reduce thermal gradients enough to avoid unacceptable stresses and to maximize electric efficiency through homogenous current density profile.

It is often desirable to protectively coat the flow field plates in order to slow down corrosion of the metal. Generally there are three main corrosion mechanisms that cause aging to solid oxide fuel cells and electrolyzers. The first is the formation of an oxide layer or layers that has low electrical conductivity onto the metal surface, another being the settling of chrome compounds evaporating from metal onto the active surfaces of the unit cell and reaction with electrochemically active materials weakening the electrochemical, chemical, electrical conductivity and/or gas permeability properties of the active material and the last being change of the bulk metal composition either by depletion of at least one bulk metal compound such as chromium or inward transfer of a compound not originally present in the bulk metal such as nickel from the fuel electrode or compounds from sealing solution. Oxide structures are generally used as protective coatings that on one hand slow down oxidant diffusion onto the surface of the metal and on the other hand diffusion of alloy atoms and compounds through the oxide structure. The price of the protective coating is often significant within the total costs of the cell stack and cost of the protective coating is on one hand influenced by the fabrication process used for the protective coating, the material and the surface to be coated protectively. Additionally it is not preferable to extend the electrically conducting protective coating to areas, which are used to seal the cell stack, because glass, ceramic materials or minerals generally used as sealants can react with the protective coating causing aging effects to the cell stack structures, for example because of increased gas leakages and/or increased electric conductivity. On the other hand, protective coatings having lower electrical conductivity values such as aluminium oxide compounds can be used to prevent chemical reactions between the steel structure and sealing materials as well as to prevent chromium evaporation from these areas.

The state of the art interconnect structures are made with forming processes from sheet metal plates. The maximum formability of the metal is limited by its mechanical properties and often both the channel area and the contact surfaces are not optimal as described above. Because of the limitation associated to the forming processes, interconnect plate structures either cause major pressure loss characteristics and/or the contact surface limits the electron transfer in the fuel cell both causing restrictions to the duty ratio of fuel cell or electrolyzer stack.

The performance of the protective coatings in SOFC interconnects is strongly linked to the chemical composition and microstructure of the deposited coatings. Since degradation of the cathode is a consequence of reactions between the cathode materials and volatile Cr oxide and oxyhydroxides, i.e., $CrO_3$, $CrO_2(OH)_2$ and $CrO_2(OH)$, which are transported through the gas phase on the active electrode, these coatings should have a dense microstructure. A dense microstructure is essential in harsh environments (high humidity and operating temperature) in order to decrease the growth of Cr-rich oxide scale, which may lead to uncontrolled breakaway oxidation and/or increase the ohmic resistance of the substrate-coating systems. The high $H_2O$ partial pressure on the anode side of a SOFC also inhibits the growth of Cr-rich oxide scale with low electrical conductivity. In addition, the anode electrode can be in direct contact with the interconnect structure, which in known SOFC operation conditions leads to transfer of nickel to the steel structure. This eventually changes the ferritic steel structure into austenitic structure having for example higher thermal expansion coefficient, electrical and mechanical properties compared to ferritic structure.

Protective metal oxide coatings can be manufactured by using various thermal spraying techniques. Prior to the spraying process, several material synthesis and powder manufacturing phases are used in order to form suitable feedstock for the spraying process, which are always required when conventional thermal spraying techniques (dry powder spraying) are employed. Some commonly used thermal spraying techniques are atmospheric plasma spraying (APS) and high velocity oxy-fuel spraying (HVOF). In general, material synthesis and powder manufacturing phases are specifically tailored according to raw material and spray equipment. As a result, time consuming research and development practises are needed in order to find the optimal material process routes. Secondly, the spray process should be optimized so that the coatings with favourable microstructure can be manufactured.

Since the metal oxide coatings used in SOFC and SOEC are relatively thin (<50 µm), the process steps, described previously, should be as robust as possible in order that any sort of variation in coating thickness and in microstructure can be minimized. Controlling the overall process becomes more challenging when conventional thermal spraying processes are being used. This is due to reason that the total coating process; including material and powder synthesis contain the multiple process steps which have a huge impact on the quality of the as-sprayed coating. This can be even more problematic when multi-layered coating structures are deposited, for example, protective metal oxide coating and another metal oxide contact layer, because the process steps are multiplied by the number of the deposited coating layers.

However, by using a novel thermal spraying technique such as the solution precursor thermal spraying (SPTS), where the feedstock is in form liquid and not in dry powder, the number of the process steps can be notably decreased. This is due to reason that the known material and powder synthesis phased are no longer needed. As a result, when then the number of process steps are decreased, the overall process becomes more robust and controllable. In addition, the coating deposition becomes more cost effective, which is more favourable when producing coatings for SOFC and SOEC stacks.

Document WO 96/288255 A1 discloses spray pyrolysis embodiments, in which no thermal flame is utilized in the spraying process. Thus, in WO 96/288255 the sprayed surface coating involves the series of separate thermal processing phases called calcination and sintering steps at 100-600° C. These process steps can involve a long processing time. Another drawback is that due to the long processing time a $CrO_2$ layer has enough time to be formed. Since, solution is sprayed on a pre-heated substrate, the formation of cracks cannot be avoided due to evaporation of volatile compounds (solvents). As a result the adequate protection against Cr-migration cannot be achieved.

SUMMARY

A protection arrangement of solid oxide cells is disclosed, each solid oxide cell having at least two fuel cell structure plates made of metal to arrange gas flows in the cell, and an active electrode structure, which includes an anode side, a cathode side, and an electrolyte element between the anode side and the cathode side, wherein the protection arrangement comprises: a first metal oxide coating on a metallic structure in a first thermal spraying coating process of liquid precursor being from at least one of nitrates and acetates based substances fed into thermal flame; and at least one other metal oxide coating formed at least partly simultaneously with said first coating process on a previously deposited metal oxide coating from liquid precursor formed from at least one of nitrates and acetates based substances fed into said thermal flame, the liquid precursor thermally sprayed contact layer bonded with a previously deposited metal oxide coating being made of material with electrical conductivity greater than 100 S/cm, and the coatings being mainly formed of particles with a size range of 10 to 500 nm due to effective droplet atomization during the spraying process.

A protection method of solid oxide cells is disclosed, the method comprising: arranging gas flows in each cell; forming in a first coating process a first metal oxide coating on a metallic structure from a liquid precursor, which is formed from at least one of nitrates and acetates based substances fed into thermal flame; and forming at least in one other coating process at least partly simultaneously with said first coating process at least one other metal oxide coating on a previously deposited metal oxide coating from liquid precursor, which is formed from at least one of nitrates and acetates based substances fed into said thermal flame, wherein the liquid precursor thermally sprayed contact layer bonded with a previously deposited metal oxide coating is made of material with high electrical conductivity greater than 100 S/cm, and the coatings are mainly formed of particles with a size range of 10 to 500 nm, due to effective droplet atomization during the spraying process.

BRIEF DESCRIPTION OF THE DRAWINGS

Other features and advantages of the present invention will be apparent to those skilled in the art upon reading the present disclosure of exemplary embodiment in conjunction with the accompanying drawings, wherein:

FIG. 6 presents an exemplary process step listing and comparison for known thermal spraying processes.

DETAILED DESCRIPTION

Figure 1:
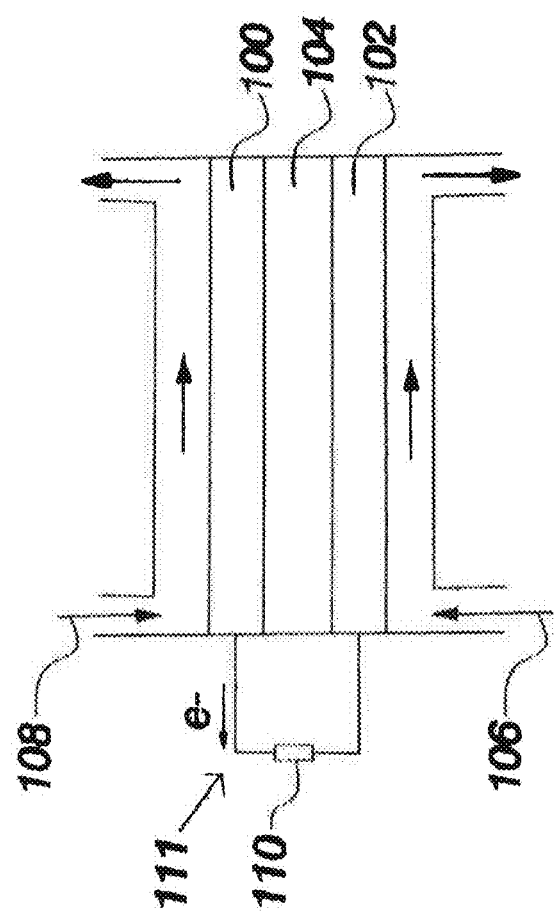
FIG. 1 presents an exemplary single fuel cell structure.

An advanced protection arrangement and method are disclosed to form multi-layered coating structures with protective and highly electrical conductivity properties onto the cell structure plates of the cells in at least partly simultaneous coating processes to prevent corrosion and to improve lifetime and electrical efficiency of the cells. This can be achieved by a protection arrangement of solid oxide cells, each solid oxide cell having at least two fuel cell structure plates made of metal to arrange gas flows in the cell, and an active electrode structure, which includes an anode side, a cathode side, and an electrolyte element between the anode side and the cathode side.

The protection arrangement includes thermal spraying means for forming in a first coating process first metal oxide coating on metallic structure from liquid precursor being formed from at least one of nitrates and acetates based substances fed into thermal flame and for forming at least in one other coating process at least partly simultaneously with the first coating process at least one other metal oxide material coating on previously deposited metal oxide coating from liquid precursor being formed from at least one of nitrates and acetates based substances fed into the thermal flame, the solution precursor thermally sprayed contact layers bonded with previously deposited coating being made of material with electrical conductivity greater than 100 S/cm, and the coatings being mainly formed of the particles with the size range of 10 to 500 nm, due to effective droplet atomization during the spraying process.

A protection method of solid oxide cells is also disclosed, in which method is arranged gas flows in the cell. In the method a first coating process forms a first metal oxide coating on metallic structure from liquid precursor, which is formed from at least one of nitrates and acetates based substances fed into thermal flame, and at least in one other coating process at least partly simultaneously with said first coating process at least one other metal oxide coating is formed on a previously deposited metal oxide coating from liquid precursor, which is formed from at least one of nitrates and acetates based substances fed into said thermal flame, and the solution precursor thermally sprayed contact layers bonded with a previously deposited metal oxide coating are made of material with electrical conductivity greater than 100 S/cm, and the coatings are mainly formed of the particles with a size range of 10 to 500 nm, due to effective droplet atomization during the spraying process.

Exemplary embodiments are based on forming in a first coating process a first metal oxide coating on metallic structure from liquid precursor and for forming at least in one other coating process at least partly simultaneously with the first coating process at least one other metal oxide coating on the metallic structure from liquid precursor.

Exemplary advantages of disclosed embodiments are that simultaneous coating processes can be performed to form overlapping multi-layered protective coatings and contact layers, while material synthesis of metal oxide coatings takes place in thermal flame. This makes the coating processes faster and more economical and in addition electrical properties can be improved as compared to known solutions.

Figure 2:
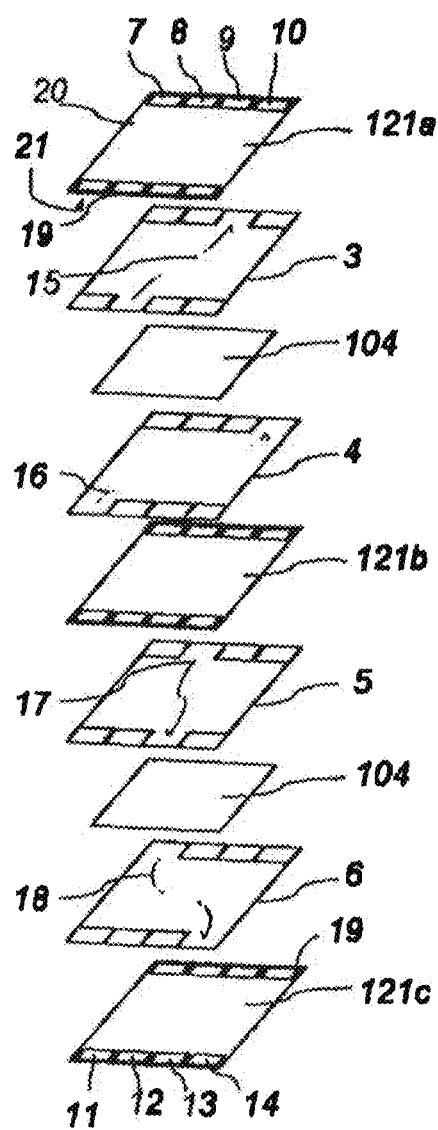
FIG. 2 presents exemplary flow field plates.

FIG. 2 shows exemplary flow field plates 121*a*, 121*b*, 121*c* of a fuel cell. A complete fuel cell stack includes several plates 121 placed on successively each other in a shown manner. The plates in this embodiment are rectangular and symmetrical. An electrolyte element structure 104 having an electrolyte layer between an anode electrode and a cathode electrode is placed between the plates 121 generally in the middle of the plate. The electrolyte element structure 104 may be any suitable electrolyte element structure and is not therefore described herein in any further detail.

The flow field plates 121 and the electrolyte element structure 104 are sealed with sealing means 3-6. The purpose of the sealing means 3-6 is to ensure that oxidant and fuel are not directly mixed without the fuel cell reactions inside the electrochemically active area, that the fuel and oxidant are not leaked out from the electrochemical cells, that the adjacent electrochemical cells are not in electronic contact with each other, and that oxidant and fuel are supplied to the desired flow field plates 121. Two opposing flow field plates 121a, 121b, 121c and the electrolyte element structure 104 therebetween form a single repetitious structure. A flow field plate 121 is a planar thin plate that is made of metal alloy, ceramic material, cermet material or other material that can withstand chemical, thermal and mechanical stresses that are present in a fuel cell.

According to exemplary embodiments, the flow field plate 121 includes inflow and outflow orifices placed at the edges of the plate 121. In this example the plate 121 is rectangular and flow orifices are placed on slightly shorter edges 19. Both of the edges 19 have four orifices, one inflow orifice 7, 11 for oxygen rich gas (in following exemplary embodiment: air), one outflow orifice 10, 14 for air, one inflow orifice 8, 12 for fuel, and one outflow orifice 9, 13 for fuel. The oxygen rich gas can be any gas or gas mixture, which includes a measurable amount of oxygen. On both of the edges 19 the orifices are arranged in a sequence that has first air in 7, 11, then fuel in 8, 12, then fuel out 9, 13, and then air out 10, 14. The surfaces of the first face 20 (in the fig. top surface) and the second face 21 (below surface, not shown) around the edges of the flow field plate are shaped to allow efficient sealing and they limit a contoured surfaces 15-18 in the middle of the flow field plate that has a specific contour for guiding fuel gas and air over the surfaces of the electrolyte elements 104. It should be noted, that the reference numerals 15-18 that depict arrows related to sealing means 3-6 that illustrate gas flow routes in FIG. 1 are also used to refer to a face and a contoured surface 15-18 of a flow field plate 121a, 121b, 121c that is facing towards the sealing means 3-6 that faces the sealing element or structure in question.

The number of the orifices for arranging the gas flows on a fuel cell stack may vary as well as the way how the gas flows are arranged. The basic idea is that orifices 7-14 on superposed flow field plates 121 are arranged so that their positions are matched and the orifices in same line form a gas manifold channel through the stack. Sealing means 3-6 are used in order to prevent feeding of the fuel and air to wrong layers between electrolyte elements and the flow field plates. The sealing means are arranged to surround each orifice 7-14 on the flow field plate 121. The flow field plate 121 and the sealing elements 3-6 are used to form ducts (i.e. channels) that go through whole fuel cell stack. The orifices in the flow field plates are super positioned in order to form such a duct.

The fuel and oxygen rich gas flow directions on the electrolyte element compared to each other can be arranged to so called co-flow arrangement where both gas flows have essentially the same direction or to so-called counter-flow arrangement where the gas flow directions differ from each other essentially by 180°.

Figure 3B:
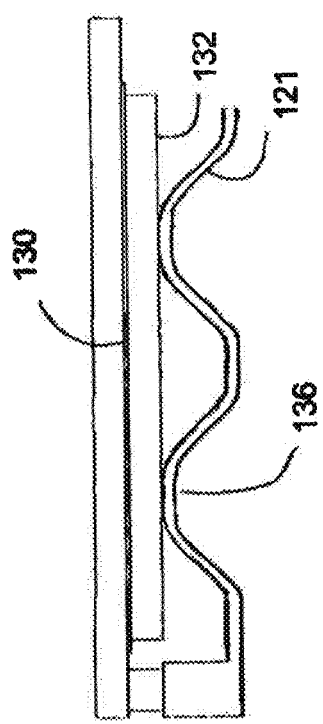
FIGS. 3A and 3B present an exemplary solid oxide cell structure according to the present disclosure.
Figure 3A:
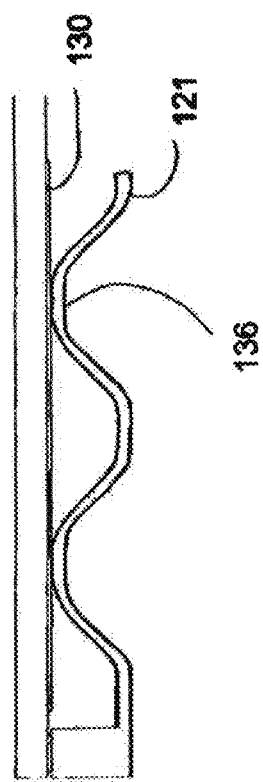

FIG. 3 shows an exemplary contacting arrangement of a solid oxide cell structure according to the present disclosure. The solid oxide cell can be for example, a fuel cell or an electrolyzer cell. A structure of the solid oxide cell is planar in exemplary preferred embodiments, but disclosed embodiments can also be utilized in other kind of solid oxide cell structures. The thickness of the anode is for example, 200 micrometers or more, the thickness of the electrolyte is, for example, 1-10 micrometers and the thickness of the cathode is for example, 30-100 micrometers in anode supported solid oxide cell structure. The thickness of the anode is for example, 30 micrometers or more, the thickness of the electrolyte is, for example, 30 micrometers or more and the thickness of the cathode is for example, 30-100 micrometers in electrolyte supported solid oxide cell structure. Each solid oxide cell includes at least two flow field plates 121 to arrange gas flows in the cell, and an active electrode structure 130, which is in more detail presented in FIG. 1 having an anode side 100, a cathode side 102, and an electrolyte element 104 between the anode side and the cathode side.

The contacting arrangement includes a gasket structure 128 to perform sealing functions in the solid oxide cell and a contact structure 132 locating between the flow field plates 121 and the active electrode structure 130. The contact material can be made of electrically conducting material, such as metal or ceramics. The contact structure 132 is at least partly adapted by a gas permeable structure according to structures of the flow field plates 121 and according to structure of the active electrode structure 130. In preferred exemplary embodiments the contact structure 132 is planar and platy, but also other forms can be utilized.

According to the present disclosure, the fuel cell or electrolyzer stack includes at least one single repetitious structure. A single repetitious structure includes at least of one electrochemically active electrolyte element structure including fuel side, electrolyte in between, and oxygen rich side, placed between at least two flow field plates the other distributing oxygen rich gas in the oxygen rich side of the electrolyte element structure and the other distributing fuel gas in the fuel side of the electrolyte element, and at least one sealing means sealing the gas atmosphere at its intended enclosure. The flow field plate has at least one inlet opening for fuel gas and/or oxygen rich gas and at least one outlet opening for used fuel gas and/or oxygen rich gas.

Exemplary preferred manufacturing methods for forming the contoured (as example: corrugated) surface are methods using plastic deformation such as stamping, pressing and like, wherein the shape of the material is changed but no material is added or removed, or methods wherein material is added such as welding or removed such as etching. Other manufacturing methods can be utilized if the flow field material is brittle such as extrusion, casting, printing, molding, and like. The orifices for fuel and air can be made in a same manufacturing step.

Each flow field plate 121 can be made similar in the stack assembly structure, thus for example, only one type of plate is needed to produce a fuel cell stack having desired amount of repetitious electrolyte element structures 104. This simplifies the structure and eases manufacturing of the fuel cells.

In fuel cell and electrolyzer systems one of the most important design functions is to maximize the efficiency of electricity production and hydrogen production, respectively. This is affected considerably on one hand by the fuel cell's/electrolyzer's own inner efficiency, but also considerably by the energy needed for feeding the gases. On the other hand it is important for the flow channel system to transfer generated and required electrons from one electrode to another. Thus the material of the flow channel system should be fabricated of material that is conducting electricity well. Additionally electrons collection from the electrode to interconnect plate structure should be arranged in a way that the portion of ohmic loss stays as small as possible in the area of the active electrode. The portion of loss in current collection of the active area is defined by the active area material's conductivity, thickness of the material, as well as the distance an electron travels when it either transfers from the flow channel plate onto the surface of the active electrode and from there to the place of reaction or respectively vice versa. A current collection area inside the flow channel plate on top of the active area that is too large again is not desirable, because then access for gases to the reaction surface is hindered. It is possible to find an optimum size of the contact surface between flow channel plate and active electrode, when supply of gases to the reaction surface as well as the electrons travel are optimized and the fuel cell's/electrolyzer's performance and efficiency can thus be optimized.

Flow field plates 121, such as flow channel plates and interconnect plate structure, are generally fabricated of steel, because of its sufficient electrical conductivity, corrosion resistance, a thermal expansion coefficient similar to the unit cell and good formability properties. When steel plate is formed, the material stretches and thus thins in the locations of the formed areas. Each material has its own characteristic maximum for forming properties and if that is surpassed, ruptures and cavities form in the material. Additionally excessive forming of the material can thin the base material excessively increasing material corrosion and shortening the life of the fuel cell/electrolyzer. Therefore in material forming gentle and rounded shapes are aspired. Because forming sets boundaries on the design of the channel, either the contact surface or the height of the channel often stays too small increasing thus inner ohmic losses and/or flow pressure losses of the cell stack.

In preferred exemplary arrangements the contact structure 132 is located between the flow field plates 121 and the cathode side 102 of the active electrode structure 130, but also other locations can be utilized in other embodiments.

The contact structure 132 according to preferred exemplary embodiments is adapted by a gas permeable structure by utilizing at least one of the following characteristics: form of the holes, size of the holes, distance between the holes, porosity of the contact structure 132 and tortuosity of the contact structure 132. The contact structure 132 can for example, include rectangular holes, which can be extended to two adjacent gas channels to improve gas distribution characteristics for example by evening out differences between gas flows of said two adjacent gas flows. Gas distribution from the gas flow channels 136 to the active electrode structure 130 can be improved by increasing size of the holes, and by minimizing the distance between two adjacent holes. Electric conductivity, heat transfer characteristics and mechanical support of the structure can on the other hand be improved by increasing the distance between the two adjacent holes and by minimizing size of the holes.

Material of the contact structure 132 includes, for example protectively coated metal or electrically conductive gas permeable ceramic sintered structure between the flow field plates 121 and the active electrode structure 130 to prevent evaporation of chrome containing species. Thickness of the contact structure 132 can be optimized according to at least one of the following characteristics: heat transfer characteristics, electrical characteristics of the contacting arrangement and gas distribution characteristics. Thickness of the gasket structure 128 can be adapted according to thickness of the contact structure 132 allowing more tolerance variations to thickness of solid oxide cells. The contact structure 132 can be made and processed by various manufacturing methods such as for example by: perforation, die cutting, etching, molding, rouletting a net structure, a porous sinter structure and/or an expanded mesh to form the gas permeable contact structure 132. Perforation refers to cutting rows and columns of small holes. Die cutting refers to a process of using a die to shear webs of low strength materials, such as clicking or dinking. Expanded mesh refers to producing expanded metal, a sheet or plate, by simultaneously slitting and stretching. Rouletting refers to accomplishing small horizontal and vertical cuts to the contact structure material.

The performance of the protective metal oxide coatings in SOFC interconnects is strongly linked to the chemical composition and microstructure of the deposited coatings. Since degradation of the cathode is a consequence of reactions between the cathode materials and volatile Cr oxide and oxyhydroxides, i.e., $CrO_3$, $CrO_2(OH)_2$ and $CrO_2(OH)$, which are transported through the gas phase, or through migration, on the triple-phase boundary (TPB), these coatings should have a dense microstructure. A protective metal oxide coating having dense microstructure is essential for example, in harsh environments (high humidity and operating temperature) in order to decrease the growth of Cr-rich oxide scale, which may lead to uncontrolled breakaway oxidation and/or increase the ohmic resistance of the substrate-coating systems.

Although protective metal oxide coatings can be manufactured various ways, the solution precursor thermal spray (SPTS) processes and especially a high velocity solution precursor flame spray (HVSPFS) process show greatest potential in the coating technology field. The high velocity solution precursor flame spray (HVSPFS) deposition technique can be categorized under the solution precursor thermal spray processes (SPTS) and represents a novel deposition technique in the thermal spraying field and it obtains the similar scalability for industrial-scale production as known thermal spraying techniques. Spinel coatings with advantageous properties for SOFC interconnects are obtained by using the high velocity solution precursor flame spray (HVSPFS) process. A clear advantage of the solution precursor thermal spray processes is the total length of the production chain to obtain as-sprayed coatings. As the materials synthesis and particle formation takes place during the spraying process 152 when fed in thermal flame, there is no need for separate materials synthesis, powder or paste preparation process phases as in known thermal spraying processes or in known wet-ceramic processes such as screen printing, dip-coating, slurry painting or similar processes as shown in FIG. 6. These phases require time (labour and storage costs) and energy (electricity), which inevitably leads to an increase in production costs. In addition, it was shown that the coatings could be produced by using relatively cheap raw materials, for instance metal nitrates or metal acetates.

FIG. 6 shows an exemplary schematic showing of a coating process that has substantially less process phases than known coatings methods, such as wet-ceramic processes or known dry powder thermal spraying processes. An exemplary difference of the method according to the present disclosure compared to known dry powder spraying processes is that, separate material synthesis and powder preparation phases are no longer needed and therefore fewer process steps are required to obtain as-sprayed coatings.

These as-sprayed solution precursor thermally sprayed (SPTS) coatings have nano-scaled coating structures meaning that coatings are formed of solid particles with a size range of 10 nm up to several micrometers, or solids on the substrate through condense due to thermal gradient. In high velocity solution precursor flame spraying (HVSPFS), the coatings are mainly formed of the particles with than exemplary size range of 10 to 500 nm, due to effective droplet atomization during the spraying process, when fed in to high velocity and high temperature thermal flame 152. However, some micron sized particles are also formed with similar particle morphology as in known thermal spray processes.

The sub-micron particles have polycrystalline characteristics, whereas nanoparticles had a more single crystal structure with fine equiaxed grains. Fast cooling rate of small splats induces a situation where homogeneous nucleation is competitive or predominant against heterogeneous nucleation.

The nano-scaled particle formation is a consequence of good atomization and evaporation of the precursors 151 a and 151 b when injected into the high velocity thermal flame. The particles are formed through the liquid-to-solid and gas-to-solid conversion route. As a result, the as-sprayed coatings have a dense microstructure, which is favourable for preventing Cr transport and enabling good electrical properties. The dense microstructure is a consequence of high kinetic energy of thermal flame 152 which enables high deposition velocity and closely packed structure of the small particles to form dense protective metal oxide coatings 160 and metal oxide contact layer 162. Since it can be expected that the mass of the sub-micron and nano-scaled particles is negligible, the flight velocity of the particles can be close to the speed of the thermal flame.

Figure 4:
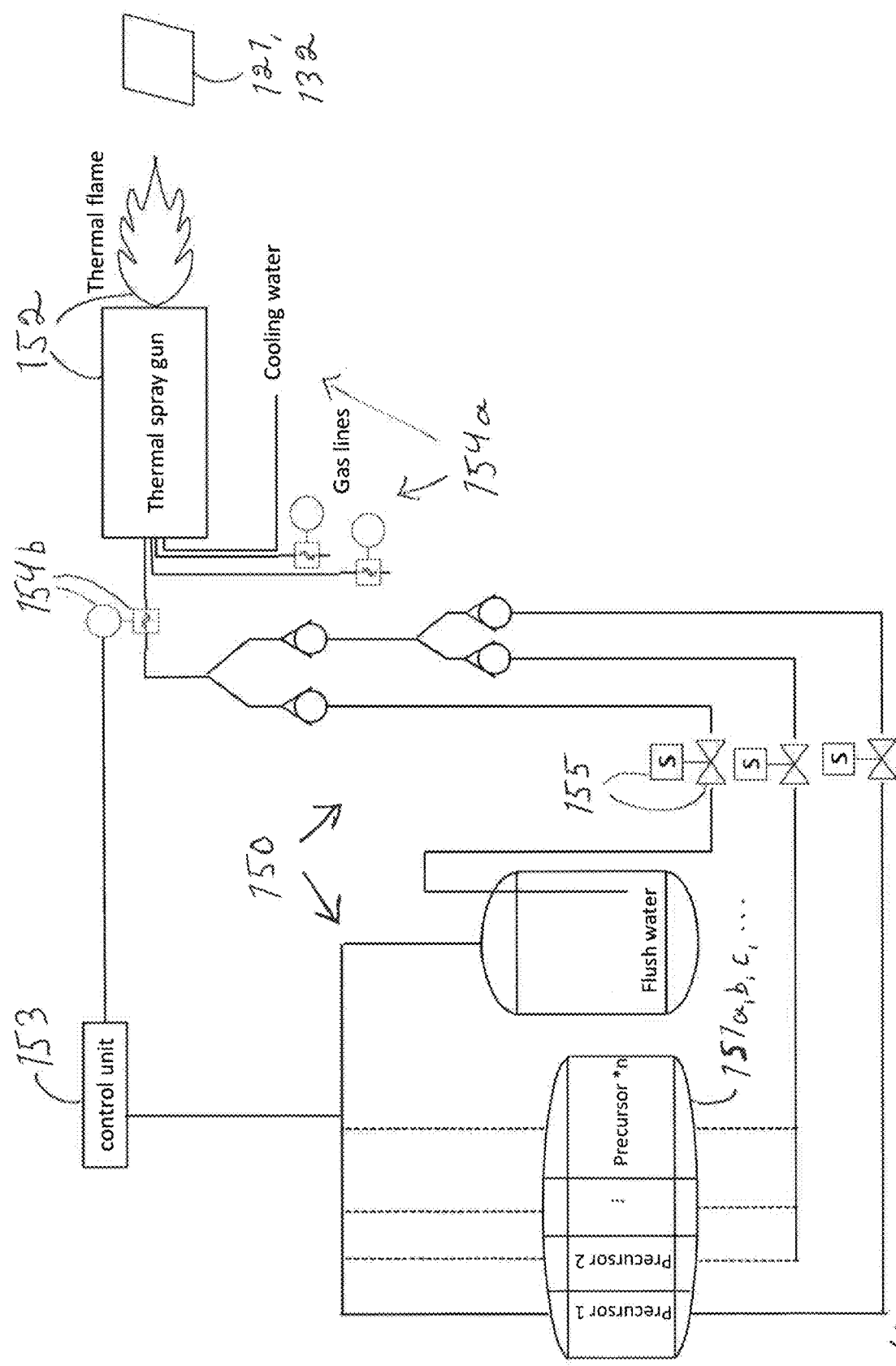
FIG. 4 presents an exemplary protection arrangement according to the present disclosure.

FIG. 4 shows an exemplary protection arrangement of solid oxide cells according to the present disclosure. Solid oxide cell can be for example a fuel cell or an electrolyzer cell. Each solid oxide cell includes at least two metallic structure 121, 132 made of metal to arrange gas flows in the cell, and an active electrode structure 130, which includes an anode side 100, a cathode side 102, and an electrolyte element 104 between the anode side and the cathode side. The protection arrangement includes means 152 for forming at least one of the metal oxide coatings 160, 162 from liquid precursor 151a, b, c . . . being formed from nitrates or acetates or both based substances fed into thermal flame having average gas velocity over 200 m/s. The means 152 can be used for forming metal oxide coating for example, on the metallic structure plates 121, 132. The formed coating on the metallic structure 121, 132 has for example thickness less than 25 μm. The metallic structure 121, 132 can be for example flow field plates, separator plates, interconnect plates, interconnector plates, bipolar plates, current collector plates, etc. Metal oxide coating can be applied on one side of the metallic structure 121, 132, i.e., the air side or fuel side, or to the both sides of the metallic structure 121, 132. The metal oxide coating composition and the microstructure can be varied on the different sides of the metallic structure 121, 132. The metal oxide coating composition and microstructure can have lateral gradients on the metallic structure 121, 132, e.g., that the area contacting the active electrode surfaces 100, 102 can be made of electrically well conductive material system as the area contacting sealing area can be made of well insulating material.

The exemplary protection arrangement according to the present disclosure presented in FIG. 4 includes means 152 for forming in a first coating process first metal oxide coating 160 on metallic structure 121, 132 from liquid compound 151 a being formed from nitrates or acetates or both based substances. At least partly simultaneously with the first coating process is formed in another coating process another metal oxide coating 162 on metallic structure 121, 132 from liquid compound 151 b being formed from nitrates or acetates or both based substances. The first material coating and the other material coating(s) are overlapping and they have an adhesion between them, that is formed by mechanical anchorage of deposited particles by partial mixing of synthetized or melted material or, for example, by both of them. Exemplary embodiments according to the present disclosure can be also formed with two or more overlapping coatings, such as so called multilayered metal oxide coatings, from liquid precursors, such as compounds 151 a, 151 b, 151 c, . . . , in a similar process as described related to the first material coating and the other material coating.

Since the efficiency of the of the solid oxide cells or electrolyzer cells is strongly linked to the electron change between contact structure 132 located between the flow field plates 121 and the cathode side 102 of the active electrode structure 130, it can be crucial to obtain interface with low ohmic losses. The low ohmic losses can be obtained by using a multi-layered metal oxide coating structure, which means producing contact layer 162 between the deposited protective coatings 160 and the active electrode structure 130. It is favourable to use the same material composition as it is used in active electrode 130. The sintering properties between contact layer 162 and the active electrode structure 130 can be improved by altering the microstructure of the deposited contact layer 162.

As a ceramic material such as metal oxides, the contact layer 162 can be produced by using the solution precursor thermal spraying (SPTS) processes. Not only that solution precursors can produce coatings with nano-scaled structure, high velocity solution precursor flame spraying (HVSPFS), can form the particles with a size range of 10 to 500 nm, due to effective droplet atomization during the spraying process, when fed in to high velocity and high temperature thermal flame 152. The particles with this size range obtain strong sintering behaviour as the majority of the free energy (deltaG$_T$) is associated in the surfaces of the micron, sub-micron and especially nanosized particles (deltaG$_s$). This free energy is enhanced by the energy bound to the small crystallite size and the number of grain boundaries (deltaG$_b$). In addition, sintering is most likely enhanced by the residual stresses and the disordered and metastable crystal structure. When the metal oxide contact layer 162 with the mentioned properties is pressed against the active electrode structure 130 at elevated temperature, material transport, through the diffusion and grain growth (solid state sintering) will produce the interface with low ohmic resistance between the active electrode structure 130 and the metal oxide contact layer 162 and further improve the contact between contact metal oxide layer 162 and protective metal oxide coating 160. For solution precursor thermally sprayed (SPTS) coatings, cf. HVSPFS coatings sintering temperature is most likely in range of 0.2-0.3 T$_m$ (where T$_m$ is the melting temperature of the material in degrees Kelvin), which is considerably lower compared to the material systems formed of micron sized particles which is 0.5-0.8 T$_m$.

The contact between the protective metal oxide coating 160 and the metal oxide contact layer 162 can be enhanced by the mechanical anchorage and partial sintering of the materials used in the protective layer and contact layer. To obtain good mechanical anchorage and well adhered coating layers the substrate roughness should be of the same order of magnitude as the deposited lamellae thickness or particle diameter, especially when nanoscaled particles are deposited. Therefore, it can be stated HVSPFS produce interface with favourable surface morphology for multi-layered coating structures with good adhesion when as-deposited, which favors of producing multi-layered coating structures.

In preferred exemplary embodiments according to the present disclosure the protection arrangement include thermal spraying means 152 for forming high velocity and high temperature flame by using combusting hydrocarbons for example propane, propylene, hydrogen, ethylene, acetylene or kerosene as a fuel.

Figure 5:
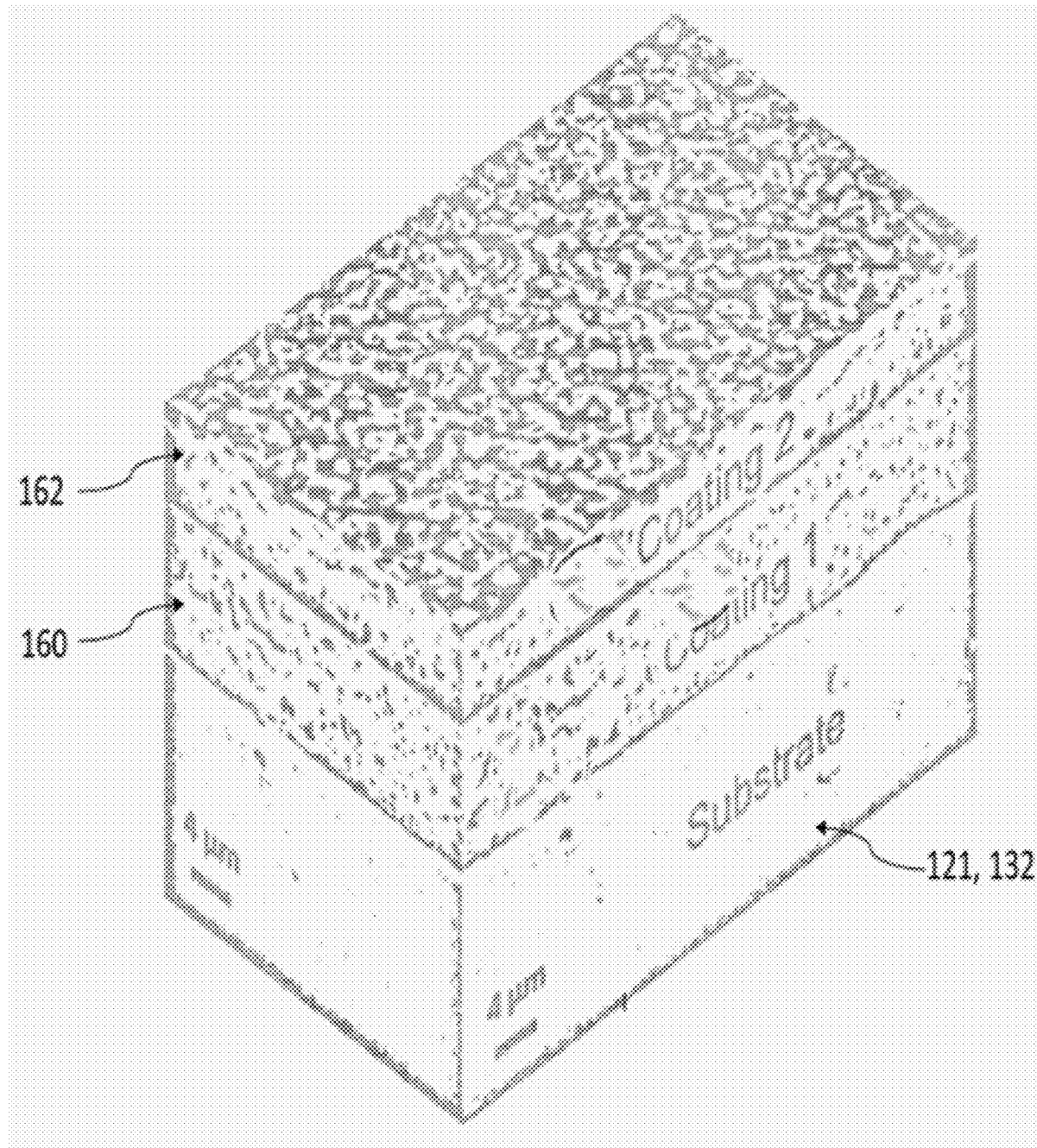
FIG. 5 presents an example of overlapping metal oxide coatings according to the present disclosure.

In an exemplary embodiment the protection arrangement includes thermal spraying means 152 for forming high temperature thermal flame to which liquid precursor is fed to form metal oxide compounds. The liquid precursor can include metal ions, which form the desired metal oxide coating 160 and metal oxide contact layer 162 with oxygen. The liquid precursor is formed from at least one of metal nitrates (manganese nitrates, cobalt nitrates, iron nitrates, cerium nitrates, yttrium nitrates, lanthanum nitrates, strontium nitrates, nickel nitrates, titanium nitrates, copper nitrates, aluminium nitrates, etc.) and metal acetates (e.g., manganese acetates, cobalt acetates, iron acetates, cerium acetates, yttrium acetates, lanthanum acetates, strontium acetates, nickel acetates, titanium acetates, copper acetates, aluminium acetates, etc.), and from solvent formed at least one of organic compounds (ethanol, isopropanol, etc) and water in which solvent at least one of metal nitrates and metal acetates are dissolved, and from organic compounds which stabilize the liquid precursor through the chelation resulting to more homogenous mixture of metal complex (e.g. citric acid, glycine, carbamide, polyvinyl alcohol, etc.). The liquid precursor is further formed from organic compounds that are exothermic above characteristic energy threshold level (e.g. citric acid, glycine, carbamide, polyvinyl alcohol, ethanol, isopropanol), and from organic compounds that form gases as a reaction product (e.g. citric acid, glycine, carbamide, polyvinyl alcohol, ethanol, isopropanol) and therefore further increase the atomization of the liquid precursor. FIG. 5 shows an exemplary protective metal oxide coating 160 and metal oxide contact layer 162 on the metallic structure 121, 132.

In an exemplary embodiment according to the present disclosure the protection arrangement can include a control unit 153 for controlling a fraction of an organic or an inorganic precursor, for example so that total cationic concentration for precursors which form the metal oxide material is between 0.1 . . . 4.5 mol/L and organic compounds to regulate thermal and physical characteristics of the thermal spraying process and to improve atomization of the liquid precursor. The organic compounds can be for example, citric acid, glycine, carbamide, etc. The thermal and physical characteristics are for example, atomization, evaporation, thermal decomposition, material synthesis and melting. The protection arrangement can include a control unit 153 for controlling a fraction of at least one of water, metal nitrates, metal acetates, organic or inorganic compounds and alcohol based solvent (e.g. ethanol, isopropanol etc.) or mixture of various solvents (in a way that alcohol concentration may vary between 0 . . . 35 vol %) in liquid form, in order to regulate thermal and physical characteristics of the thermal spraying process and to improve atomization of liquid precursor. The means 150 can also be used in an exemplary embodiment to form material containing at least water, metal nitrates, metal acetates, organic or inorganic additives in liquid form in order to improve exothermic characteristics of the coating material.

In exemplary embodiments according to the present disclosure high temperature and high velocity thermal flame can be accomplished for example, by combusting as hydrocarbons either propane, propylene, hydrogen, ethylene, acetylene, kerosene or mixture of hydrocarbons with oxygen. In addition, in some embodiments, the flame can be formed by forming plasma plume by using one or two atom gases for example, argon, helium, hydrogen or ternary gas mixtures. In exemplary preferred protection arrangements according to the present disclosure the thermal spraying means 152 for forming high temperature and high velocity thermal flame by using hydrocarbons as a fuel (e.g., propane) and organic and/or inorganic additives or mixture of additives such as citric acid, glycine, carbamide, polyvinyl alcohol, etc. The presented exemplary protection arrangement of FIG. 4 includes also gas lines 154 $a$ with flow controllers and cooling water 154 $a$, precursor feeding 154 $b$ and control unit 153, which can be for example, pneumatic based (pressurized vessel) and/or mechanical based (peristaltic pump or similar) for controlling feeding rate and feeding speed of the precursor and the material formation according to the disclosure. The arrangement also includes valves 155 to regulate water and other substance flows to the means 150 for forming material for the thermal spray process. The precursor 151 $a$, 151 $b$ feeding and control unit 153, the valves 155 to regulate water and other substance flows to the means 150, which flows can be modified, is a way that multiple materials can be sprayed without pausing/running down the coating process when depositing the metal oxide contact layer 162 on the protective metal oxide layer 160. The means 150 can be modified also in a way that different material systems 160, 162 can be applied on the different sides of metallic structure 121, 132 by increasing the number of precursor feeding 151 $a$, $b$, $c$ . . . units and for making laterally gradient metal oxide coating structures on the metallic structure 121, 132. By adjusting the time interval when injecting the precursors into the spraying process 152, the coating layer composition change can be either gradual from the protective metal oxide coating 160 to the conductive metal oxide layer 162 or with a clear interface between the protective metal oxide coating 160 and the conductive metal oxide layer 162. In addition, by adjusting the spraying parameters, meaning feed rate and rate hydrocarbons and oxygen, the coating microstructure can be altered, e.g., from porous to dense, with gradual or with clear change in the interfaces.

Exemplary embodiments according to the present disclosure can use thermal spraying techniques for example, atmospheric plasma spraying (APS), controlled atmosphere plasma spraying, vacuum plasma spraying (VPS), suspension plasma spraying (SPS), solution precursor plasma spraying (SPPS), flame spraying (FS), liquid flame spraying (LFS), high velocity oxy-fuel (HVOF) spraying, high velocity flame spraying (HVFS), suspension high velocity oxy-fuel spraying (S-HVOF), high velocity solution precursor flame spraying (HVSPFS), high velocity air-fuel (HVAF) spraying and solution precursor thermal spray processes (SPTS).

The greatest potential for protective metal oxide coatings 160 on the air side of the solid cell structure are for example, ceramic materials with the generic formula of spinel (A, B)$_3$O$_4$, where A and B are metallic cations. The present interest in SOFC use is focused on $Mn_{2-x}Co_{1+x}O_4$ based spinels (where x=0 . . . 1) as these materials obtain good Cr-barrier properties against migrating Cr-species and formation of more chemically stabile (Mn,Co,Cr)$_3$O$_4$ spinels with enhanced electrical conductivity properties compared to Cr oxide layer forming on the steel structure without any protective coating structure. Mn—Co—O spinels have cubic and tetragonal crystal structures when the stoichiometric factor x is between 0.3-0.9 in the $Mn_{1+x}Co_{2-x}O_4$ system. $Mn_{2-x}Co_{1+x}O_4$ spinels have acceptable electrical properties with electrical conductivities varying from 15 . . . 68 S/cm in a temperature range of 700 . . . 800° C., in terms of the chemical composition. Iron doping in small amount, by obtaining $MnCo_{2-x}Fe_xO_4$, most likely enhances electronic conduction. Doping causes the formation of ($Co^{2+}$, $Mn^{2+}$, $Fe^{3+}$) ($Co^{2+}$, $Co^{3+}$, $Mn^{3+}$, $Fe^{2+}$, $Fe^{3+}$)$_2$O$_4$ cation distribution in the spinel system, as Co cations have a stronger tendency to occupy tetrahedral sites compared to Mn cations, and Fe cations have a lower tendency to occupy tetrahedral sites than Co and Mn cations. Due to the presence of mixed valence states at octahedral sites in the $(A,B)_3O_4$ spinel system, the activation energy ($E_a$) for $MnCo_{1.9}Fe_{0.1}O_4$ is 0.38 eV, i.e. lower than the $E_a$ of $MnCo_2O_4$, which is 0.44 eV. As a result electronic conductivities of 38 . . . 72 S/cm for $MnCo_{1.9}Fe_{0.1}O_4$ at 800° C., and 85 S/cm for $MnCo_{1.8}Fe_{0.15}O_4$ at 800° C. in air can be obtained. Several other spinels, such as $CuFe_2O_4$, $CuMn_2O_4$ show great interest as well, obtaining high electrical conductivities. Spinel materials can be further doped with rear-earth metals such as Ce, Y that have been shown to further stabilize the coating structure by increasing the bonding strength of the coating and steel and to decrease the chromium mobility in the coating structure. The same materials can be used also to protect the fuel side of the solid oxide structure to prevent oxide scale growth and diffusion of nickel from the active fuel electrode to the metal structure.

Contact metal oxide coating (162) can be applied between active electrode (100, 102) structure and the metallic structure (121, 160) in order to decrease the contact losses between the interfaces and to increase the lateral conductivity of the metal oxide coating solution (160,162). The contact metal oxide coating (162) material is for example, the same as the active electrode material, such as on the air side coating material is for example perovskite structures ($ABO_3$) such as $(La,Sr)MnO_{3-\delta}$, $(La,Sr)(Co,Fe)O_{3-\delta}$, $(La,Sr)CoO_{3-\delta}$, or has otherwise high electrical conductivity value, low contact resistance to the active electrode layer and high chemical stability such as $La(Ni,Fe)O_{3-\delta}$, $Sr(Ti,Fe)O_{3-\delta}$, and on fuel side most commonly used contact material is nickel deposed in form of NiO but also other materials such as titanates can be used for the purpose. The electrical conductivity has to be higher for the used contact material compared to the protective metal oxide coating material in order that to be affective. For example, $(La,Sr)CoO_{3-\delta}$, has electrical conductivity >1000 S/cm, $La(Ni,Fe)O_{3-\delta}$ around 300 S/cm and Ni>>1000 S/cm in the known solid oxide cell operating temperature range all having around order of magnitude higher conductivity as, for example, for known protective coating spinel materials. For example, layer thickness of the contact metal oxide coating (162) is from a few micrometers up to tens of micrometers. Microstructure properties and surface properties of the contact coating (162) layer may vary according to the active electrode surface structure in order to maximize the contact points and bonding between the contact layer (162) and one of the active electrode (100, 102) structure.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. A protection arrangement of solid oxide cells, each solid oxide cell having at least two fuel cell structure plates made of metal to arrange gas flows in the cell, and an active electrode structure, which includes an anode side, a cathode side, and an electrolyte element between the anode side and the cathode side, wherein the protection arrangement comprises:

a first metal oxide coating on a metallic structure in a solution precursor thermal spraying being from an at least one of nitrates and acetates based substances fed into a thermal flame by using combusting hydrocarbons as a fuel; and at least one other metal oxide coating formed at least partly simultaneously with the first metal oxide coating from a liquid precursor formed from the at least one of nitrates and acetates based substances fed into the thermal flame, the at least one other metal oxide coating bonded with the first metal oxide coating being made of material with electrical conductivity greater than 100 S/cm, and the metal oxide coatings being mainly formed of particles with a size range of 10 to 500 nm due to effective droplet atomization during the spraying process.

2. The protection arrangement of solid oxide cells according to the claim 1, wherein
a microstructure from at least one of the first metal oxide coating and the at least one of the other metal oxide coating represents at least one of an adjusted feed rate and amount of hydrocarbons and oxygen, and wherein the adjusted feed rate and amount of hydrocarbons and oxygen is controlled by a flow controller.

3. The protection arrangement of solid oxide cells according to the claim 1, wherein
at least one of the first metal oxide coating or the at least one other metal oxide coating is formed from the liquid precursor, the liquid precursor being formed from the at least one of nitrates and acetates based substances fed into a thermal spray gun having the thermal flame having an average gas velocity over 200 m/s.

4. The protection arrangement of solid oxide cells according to the claim 1, wherein
a composition change between the first metal oxide coating and the at least one other metal oxide coating represents an adjusted time interval of a precursor flow rate when fed into the thermal flame, and wherein the adjusted time interval of the precursor flow rate is controlled by a control unit.

5. A protection method of solid oxide cells, the method comprising:
arranging gas flows in each cell;
forming in a solution precursor thermal spraying a first metal oxide coating on a metallic structure from a liquid precursor, which is formed from an at least one of nitrates and acetates based substances fed into a thermal flame by using combusting hydrocarbons as fuel; and
forming at least in one other coating process at least partly simultaneously with the first metal oxide coating at least one other metal oxide coating on the first metal oxide coating from the liquid precursor, which is formed from the at least one of nitrates and acetates based substances fed into the thermal flame, wherein the at least one other metal oxide coating first metal oxide coating is made of material with electrical conductivity greater than 100 S/cm, and the metal oxide coatings are mainly formed of particles with a size range of 10 to 500 nm, due to effective droplet atomization during the spraying process.

6. Protection method of solid oxide cells according to the claim 5, comprising:
altering a coating microstructure by adjusting at least one of feed rate and amount of hydrocarbons and oxygen.

7. Protection method of solid oxide cells according to the claim 5, comprising:

forming at least one of the coatings from the liquid precursor, which is formed from the at least one of nitrates and acetates based substances fed into the thermal flame having average gas velocity over 200 m/s.

8. Protection method of solid oxide cells according to the claim 5, comprising:
controlling a composition change between the first metal oxide coating and the at least one other metal oxide coating by adjusting a time interval of precursor flow rate when fed in to the thermal flame.

* * * * *